United States Patent [19]
Leibman

[11] Patent Number: 6,024,497
[45] Date of Patent: Feb. 15, 2000

[54] BUSHING WITH MOLDED SPRING

[75] Inventor: Bernard Leibman, Webster, N.Y.

[73] Assignee: Xerox Corporation, Stamford, Conn.

[21] Appl. No.: 09/106,414

[22] Filed: Jun. 29, 1998

[51] Int. Cl.[7] .............................. F16C 35/02; F16C 27/02
[52] U.S. Cl. ........................ 384/428; 384/215; 384/416; 384/419
[58] Field of Search .................................. 384/192, 202, 384/215, 256, 416, 418, 419, 428

[56]  References Cited

U.S. PATENT DOCUMENTS

| 4,194,711 | 3/1980 | Rubinstein | 384/419 |
| 4,420,241 | 12/1983 | Kastl et al. | 384/428 X |
| 4,452,524 | 6/1984 | Parisi | 355/3 FU |
| 4,850,584 | 7/1989 | Watashi | 384/215 X |
| 5,153,633 | 10/1992 | Bober et al. | 355/319 |
| 5,191,379 | 3/1993 | Manzer et al. | 355/282 |
| 5,346,199 | 9/1994 | Martin et al. | 271/110 |
| 5,383,006 | 1/1995 | Castelli | 355/212 |
| 5,457,520 | 10/1995 | Schell et al. | 384/419 X |
| 5,672,019 | 9/1997 | Hiramatsu et al. | 400/624 |

Primary Examiner—Thomas R. Hannon
Attorney, Agent, or Firm—John S. Wagley; Andrew D. Ryan

[57] ABSTRACT

A bushing mountable in a housing for supporting a rotating member and for providing a bias force to the rotating member in a first direction is disclosed. The bushing includes a body defining an aperture therein and a mounting member for mounting the bushing to the housing. The bushing also includes a biasing member operably associated with said body and said mounting member. At least two of said biasing member, said mounting member and said body are integral with each other.

18 Claims, 7 Drawing Sheets

FIG. 4
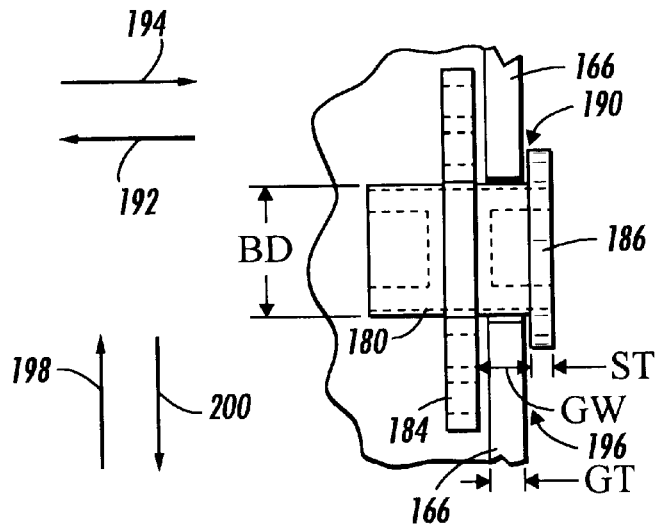
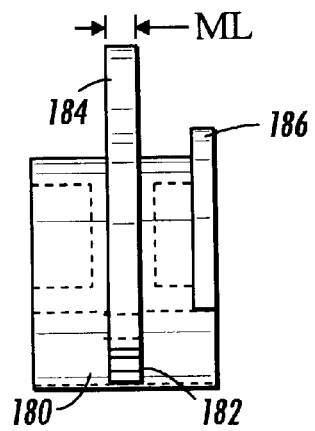
FIG. 5

FIG. 8A (PRIOR ART)
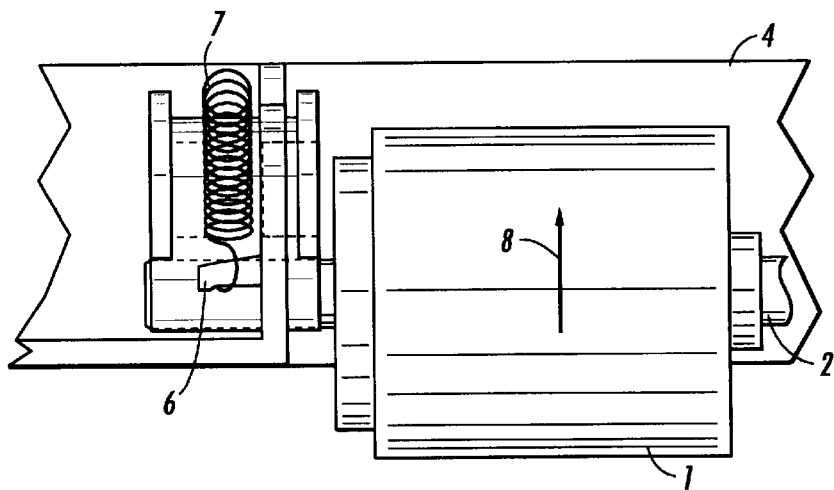
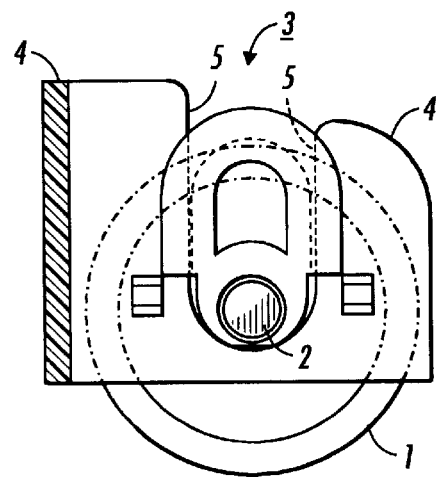
FIG. 8B (PRIOR ART)

BUSHING WITH MOLDED SPRING

The present invention relates to a printing machine. More specifically, the invention relates to a spring for biasing a member in a printing machine.

The features of the present invention are useful in any industry where manufactured components require biasing or require urging in a particular direction. One such type of machines are printing machines, for example, electrophotographic printing machines.

In the process of electrophotographic printing, a photoconductive surface is charged to a substantially uniform potential. The photoconductive surface is image wise exposed to record an electrostatic latent image corresponding to the informational areas of an original document being reproduced. This records an electrostatic latent image on the photoconductive surface corresponding to the informational areas contained within the original document. Thereafter, a marking material such as toner particles is transported into contact with the electrostatic latent image in a region known as the development zone. Toner particles are attracted from the magnetic roll to the latent image. The resultant toner powder image is then transferred from the photoconductive surface to a copy sheet and permanently affixed thereto. The foregoing generally describes a typical mono-color single component development electrophotographic copying machine.

Printing machines require mechanisms within the machine to advance the substrate or copy sheet through the xerographic process steps in order for the developed image may be transferred onto the copy sheet and fused thereto. Typically, the advancement of the copy sheets through the printing machine is accomplished through the use of a series of drive rolls which are positioned near chutes or parallel guide surfaces between which the copy sheet is advanced. For each drive roll, a support or backup roll is positioned adjacent to a drive roll which forms a nip there between. The paper is positioned in the nip so that it may be thereby advanced along the paper path.

In order that the printing machine may take on a variety of paper weights or thicknesses, at least one of the drive roll and the backup roll is floating or movable with respect to the other roll so that the nip or distance between the drive roll and the backup roll may be varied to accommodate the various paper thicknesses.

Typically, the accommodating of the different thicknesses is accomplished by the use of a spring biased backup roll which is movable to and away from the drive roll. The adjustment of the backup roll is typically accommodated by the use of a spring bias which biases the backup roll toward the drive roll.

A typical prior art backup roll is shown as roll 1 of FIGS. 8A and 8B. The roll 1 is supported at opposed ends by roll shaft 2 (only one of which is shown). The roll shaft 2 is supported by bushing 3. The bushing 3 is mounted onto housing 4 by guide rails 5 and tabs 6. The bushing 3 is slidingly fitted to the guide rails 5 of the housing 4. The bushing 3 is further restrained by a helical spring 7 which is wrapped around the bushing 3 and connected to the housing 4 by tabs 6. The roll 1 is permitted to move in the direction of arrow 8 by the expansion of spring 7 in the direction of arrow 8.

As can be seen by the roll 1 of FIG. 7, the use of the spring 7 necessitates the use of a small delicate spring which must be carefully hand-assembled to the tabs 6. The process of assembling the springs to the tabs is very difficult and time consuming. Further, the use of the springs and the bushings is very expensive and since a large number of the rolls are required for a printing machine, the cost associated therewith are extensive.

The following disclosures may be relevant to various aspects of the present invention:

U.S. Pat. No. 5,672,019 Patentee: Hiramatsu, et al. Issue Date: Sep. 30, 1997

U.S. Pat. No. 5,383,006 Patentee: Castelli Issue Date: Jan. 17, 1995

U.S. Pat. No. 5,346,199 Patentee: Martin et al. Issue Date: Sep. 13, 1994

U.S. Pat. No. 5,191,379 Patentee: Manzer et al. Issue Date: Mar. 2, 1993

U.S. Pat. No. 5,153,663 Patentee: Bober, et al. Issue Date: Oct. 6, 1992

U.S. Pat. No. 4,452,524 Patentee: Parisi Issue Date: Jun. 5, 1984

U.S. Pat. No. 5,672,019 discloses a sheet supplying apparatus including sheet supporting means for supporting a sheet, rotary supply means for feeding out the sheet, rotary convey means for conveying the sheet by a predetermined amount and then for effecting the registration of the sheet by a reverse rotation, drive means for driving the rotary convey means in a normal direction and a reverse direction, a switching output gear connected to the drive means so that a driving force from the drive means is transmitted to the switching output gear, and switching means for engaging the switching output gear with an input gear connected to the rotary supply means to transmit a rotational driving force of the rotary convey means to the rotary supply means, and for disengaging the switching output gear from the input gear.

U.S. Pat. No. 5,383,006 discloses an apparatus for guiding a moving belt, particularly in an electrophotographic printing machine of the type having an endless photoreceptor belt supported by a plurality of rolls and arranged to move in a predetermined path through a plurality of processing stations disposed therealong. The belt is of the type which is supported by a plurality of rolls. A compliant belt guide is positioned at each end of a tensioning roll. The guide is biased so as to absorb a portion of the force exerted on it by the moving belt but to maintain a minimal belt walk in a direction transverse to the predetermined path.

U.S. Pat. No. 5,346,199 discloses an adjustable nudger roll for use in a friction retard feeder. The roll includes multiple springs used in conjunction with the nudger roll in order to allow greater latitude for adjustment of the normal force of the nudger roll against a substrate stack and in order to reduce the incidence of misfeeds. This arrangement adjusts the normal force on substrates as the requirement of the feed force changes and thereby reduces misfeeds and multifeeds.

U.S. Pat. No. 5,191,379 discloses a flattening device for use in a single-sheet page printer for both-sided printing of recording media for flattening the curled recording media resulting from pressure and temperature influences in the print fixing station of the printer. The flattening device deforms the recording media in the plastic domain so that the recording media are again lent a smooth and flat form. To this end, the recording medium is pulled over an edge by paper conveyor rollers opposite a pressing power exerted by spring elements and is thereby pulled taut and aligned. When the flattening device is arranged immediately following the fixing station, then it is proposed that the pressure roller be set back in the direction of the recording medium delivery relative to the position of the fixing drum. The geometrical design of a paper guide channel that immediately follows the fixing nip of the fixing means is such that the recording medium is thereby first curved in one direction and is subsequently curved in the opposite direction, so that a smooth and flat recording medium is ejected from the paper guide channel. Recording media of the greatest variety of paper qualities having different weights is flattened by the flattening device.

U.S. Pat. No. 5,153,663 discloses a simple, low cost corrugation device for removing curl from sheets. The device includes a compliant corrugator roll that is effective with light weight, low beam strength papers needing corrugation and passive with heavy weight, high beam stiffness papers not needing/not wanting corrugation. One type of corrugation roll is a cylindrical elastomeric roll made of a foam or sponge-like material. An alternative corrugator roll configuration is a hollow frustum of a cone.

U.S. Pat. No. 4,452,524 discloses an electrostatographic reproducing apparatus including a first frame portion and a second frame portion are oriented relative to each other to define at least in part, a copy sheet transport path with the second frame portion being pivotally mounted toward and away from the first frame portion thereby providing open and closed positions with respect to the first frame portion. The first frame portion includes at least one fixed driven sheet transport roll and the second frame portion includes at least one idler nip roll positioned opposite the sheet transport roll in the first frame portion. The second frame portion further including means to bias the second frame portion toward the first frame portion so that the idler nip roll is directly biased into driving engagement with the driven sheet transport roll in the first frame portion and the second frame portion is self-referenced against the first frame portion. In a specific embodiment the second frame portion includes a low mass radiant fuser to fix toner images to the copy sheet, and means to guide the copy sheet from the toner transfer station to the fixing station, and the first frame member contains the drive train for other functions that are performed around a rotatable imaging drum having a photoconductive insulating layer on its surface.

In accordance with one aspect of the present invention, there is provided a bushing mountable in a housing for supporting a rotating member and for providing a bias force to the rotating member in a first direction. The bushing includes a body defining an aperture therein and a mounting member for mounting the bushing to the housing. The bushing also includes a biasing member operably associated with the body and the mounting member. At least two of the biasing member, the mounting member and the body are integral with each other.

In accordance with another aspect of the present invention, there is provided an electrophotographic printing machine of the type having a bushing mountable in a housing for supporting a rotating member and for providing a bias force to the rotating member in a first direction is disclosed. The bushing includes a body defining an aperture therein and a mounting member for mounting the bushing to the housing. The bushing also includes a biasing member operably associated with the body and the mounting member. At least two of the biasing member, the mounting member and the body are integral with each other.

In accordance with a further aspect of the present invention, there is provided a bushing mountable in a housing for supporting a rotating member and for providing a bias force to the rotating member in a first direction. The bushing includes a body defining an aperture therein and a mounting member for mounting the bushing to the housing. The bushing also includes a biasing member operably associated with the body and the mounting member, the biasing member including a first arcuate member extending from the base and a second arcuate member extending from the base and spaced from the first arcuate member, the biasing member extending outwardly from the body, the biasing member, the mounting member and the body having a one-piece construction.

The invention will be described in detail herein with reference to the following figures in which like reference numerals denote like elements and wherein:

FIG. 4 is a top view of the bushing of FIG. 1;

FIG. 5 is an end view of the bushing of FIG. 1;

FIG. 8A is a plan view of a prior art bushing; and FIG. 8B is an end view of the prior art bushing of FIG. 8A.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 3:
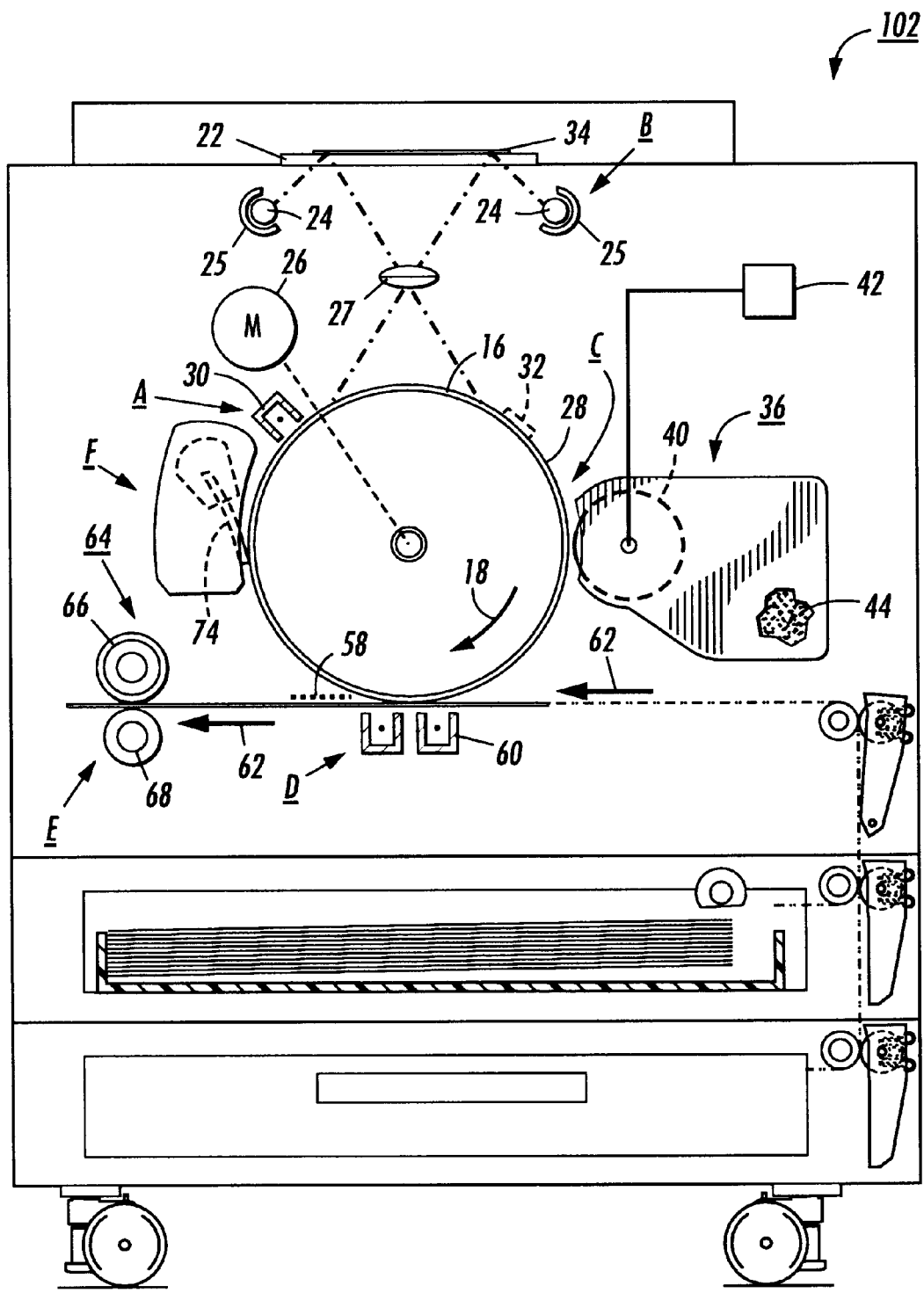
FIG. 3 is a schematic elevational view of an electrophotographic printing machine incorporating the FIG. 1 bushing therein.

For a general understanding of the illustrative electrophotographic printing machine incorporating the features of the present invention therein, reference is made to the drawings. In the drawings, like reference numerals have been used throughout to designate identical elements. FIG. 3 schematically depicts the various components of an electrophotographic printing machine incorporating the integral biasing feature of the present invention therein. Although the integral biasing feature of the present invention is particularly well adapted for use in the illustrative printing machine, it will become evident that the integral biasing feature is equally well suited for use in a wide variety of printing machines and are not necessarily limited in its application to the particular embodiment shown herein.

Referring now to FIG. 3, the electrophotographic printing machine shown employs a photoconductive drum 16, although photoreceptors in the form of a belt are also known, and may be substituted therefor. The drum 16 has a photoconductive surface 28 deposited on a conductive substrate. Drum 16 moves in the direction of arrow 18 to advance successive portions thereof sequentially through the various processing stations disposed about the path of movement thereof. Motor 26 rotates drum 16 to advance drum 16 in the direction of arrow 18. Drum 16 is coupled to motor 26 by suitable means such as a drive.

Initially successive portions of drum 16 pass through charging station A. At charging station A, a corona generating device, indicated generally by the reference numeral 30, charges the drum 16 to a selectively high uniform electrical potential, preferably negative. Any suitable control, well known in the art, may be employed for controlling the corona generating device 30.

A document 34 to be reproduced is placed on a platen 22, located at imaging station B, where it is illuminated in known manner by a light source such as a tungsten halogen lamp 24. The document thus exposed is imaged onto the drum 16 by a system of mirrors 25 and lens 27, as shown. The optical image selectively discharges the surface 28 of the drum 16 in an image configuration whereby an electrostatic latent image 32 of the original document is recorded on the drum 16 at the imaging station B.

It should be appreciated that the printing machine may be a digital printing machine. In a digital printing machine a ROS (Remote Optical Scanner) may lay out the image in a series of horizontal scan lines with each line having a specific number of pixels per inch. The ROS may include a laser (not shown) having a rotating polygon mirror block associated therewith. The ROS exposes the photoconductive surface of the printer.

At development station C, a magnetic development system or unit, indicated generally by the reference numeral 36 advances developer materials into contact with the electrostatic latent images. Preferably, the magnetic developer unit includes a magnetic developer roller mounted in a housing. Thus, developer unit 36 contains a magnetic roller 40. The roller 40 advances toner particles into contact with the latent image. Appropriate developer biasing is may be accomplished via power supply 42, electrically connected to developer unit 36.

The developer unit 36 develops the charged image areas of the photoconductive surface. This developer unit contains magnetic black toner, for example, particles 44 which are charged by the electrostatic field existing between the photoconductive surface and the electrically biased developer roll in the developer unit. Power supply 42 electrically biases the magnetic roll 40.

A sheet of support material 58 is moved into contact with the toner image at transfer station D. The sheet of support material is advanced to transfer station D by a suitable sheet feeding apparatus, not shown. Preferably, the sheet feeding apparatus includes a feed roll contacting the uppermost sheet of a stack copy sheets. Feed rolls rotate so as to advance the uppermost sheet from the stack into a chute which directs the advancing sheet of support material into contact with the photoconductive surface of drum 16 in a timed sequence so that the toner powder image developed thereon contacts the advancing sheet of support material at transfer station D.

Transfer station D includes a corona generating device 60 which sprays ions of a suitable polarity onto the backside of sheet 58. This attracts the toner powder image from the drum 16 to sheet 58. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a pressure roller 68. Sheet 58 passes between fuser roller 66 and pressure roller 68 with the toner powder image contacting fuser roller 66. In this manner, the toner powder image is permanently affixed to sheet 58. After fusing, a chute, not shown, guides the advancing sheet 58 to a catch tray, also not shown, for subsequent removal from the printing machine by the operator. It will also be understood that other post-fusing operations can be included, for example, stapling, binding, inverting and returning the sheet for duplexing and the like.

After the sheet of support material is separated from the photoconductive surface of drum 16, the residual toner particles carried by image and the non-image areas on the photoconductive surface are charged to a suitable polarity and level by a preclean charging device (not shown) to enable removal therefrom. These particles are removed at cleaning station F. A cleaner unit is disposed at the cleaner station F. The cleaner unit has a blade 74 that scrapes the residual toner particles from the drum 16 and then the particles are deposited into a waste container. Subsequent to cleaning, a discharge lamp or corona generating device (not shown) dissipates any residual electrostatic charge remaining prior to the charging thereof for the next successive imaging cycle.

It is believed that the foregoing description is sufficient for purposes of the present application to illustrate the general operation of an electrophotographic printing machine incorporating the apparatus of the present invention therein.

Figure 6:
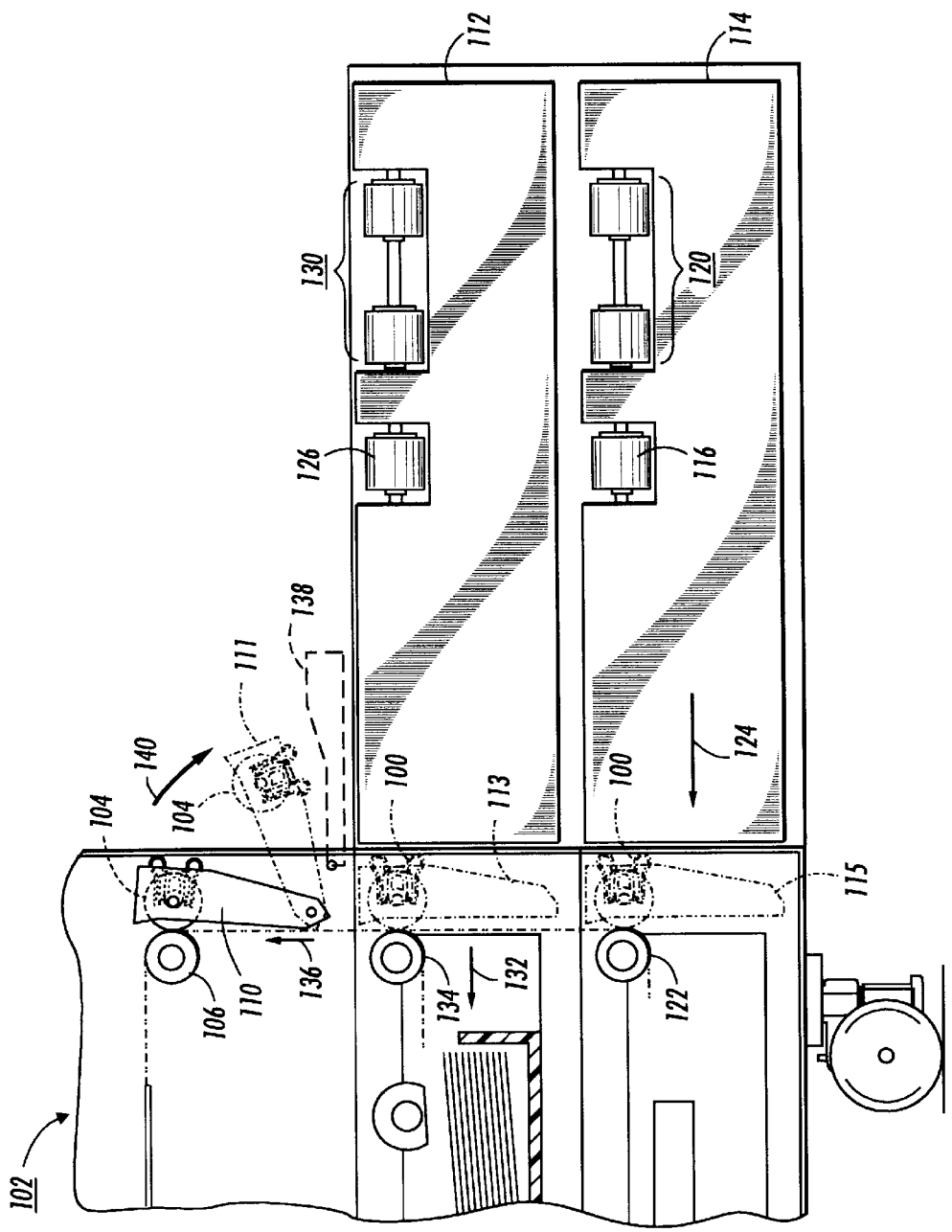
FIG. 6 is an enlarged schematic elevational view of a portion of the electrophotographic printing machine of FIG. 3.

According to the present invention and referring to FIG. 6, an integral biasing member and bushing 100, according to the present invention, is shown within printing machine 102. The biasing member and bushing 100 is utilized to bias backup roll 104 against drive roll 106. It should be appreciated that the biasing member and bushing 100 may be utilized for all backup rolls used to provide backup support for the drive roll regardless of where they may be located within the copy sheet path within the printing machine 102.

For example and as shown in FIG. 6, the backup roll 104 is located within horizontally pivoting door chute 110. It should be appreciated that the backup rolls 104 may also be utilized in the vertically pivoting door chutes 112 and 114. Door chute 114 is shown in solid in the open position and in a closed or operating position 115 as shown in phantom. The door chute 114 includes a single backup roll 116 as well as dual backup rolls 120. The door chute 114 provides jam clearance between the backup rolls 116 and 120 and drive roll 122. It should be appreciated that drive roll 122 may be one long roll extending the length of the sheet of paper or be in the form of three shorter rolls each having a length similar to the backup rolls 116 and 120. Biasing member and bushing 100 serves to urge the backup rolls 116 and 120 in the direction of arrow 124.

The door chute 112, as shown in FIG. 6 in solid, is in an open position for jam clearance and as shown in phantom is in an operating position 113. The door chute 112 includes backup rolls 126 and 130 which are biased in the operation position in the direction of arrow 132 by biasing member and bushing 100. The backup rolls 126 and 130 mate with drive roll 134 to advance the print sheet in the direction of arrow 136. It should be appreciated that drive roll 134 like drive roll 122 may be a long solitary roll a series of shorter rolls.

Door chute 110 is shown in solid in an operating position with the backup roll 104 in contact with drive roll 106. It should be appreciated that the drive roll 106 and the backup roll 104 may be a long solid roll extending the length of the paper or be a series of shorter rolls. A pivoting cover 138 may be positioned over door chute 110 and may be placed into the opened position as shown in phantom. The door chute 110 is pivotable in the direction of arrow 140 so that the door 110 may be opened to the clearing position 111 as shown in phantom to provide for clearing of jammed sheets between the drive roll 106 and the backup roll 104.

Figure 7:
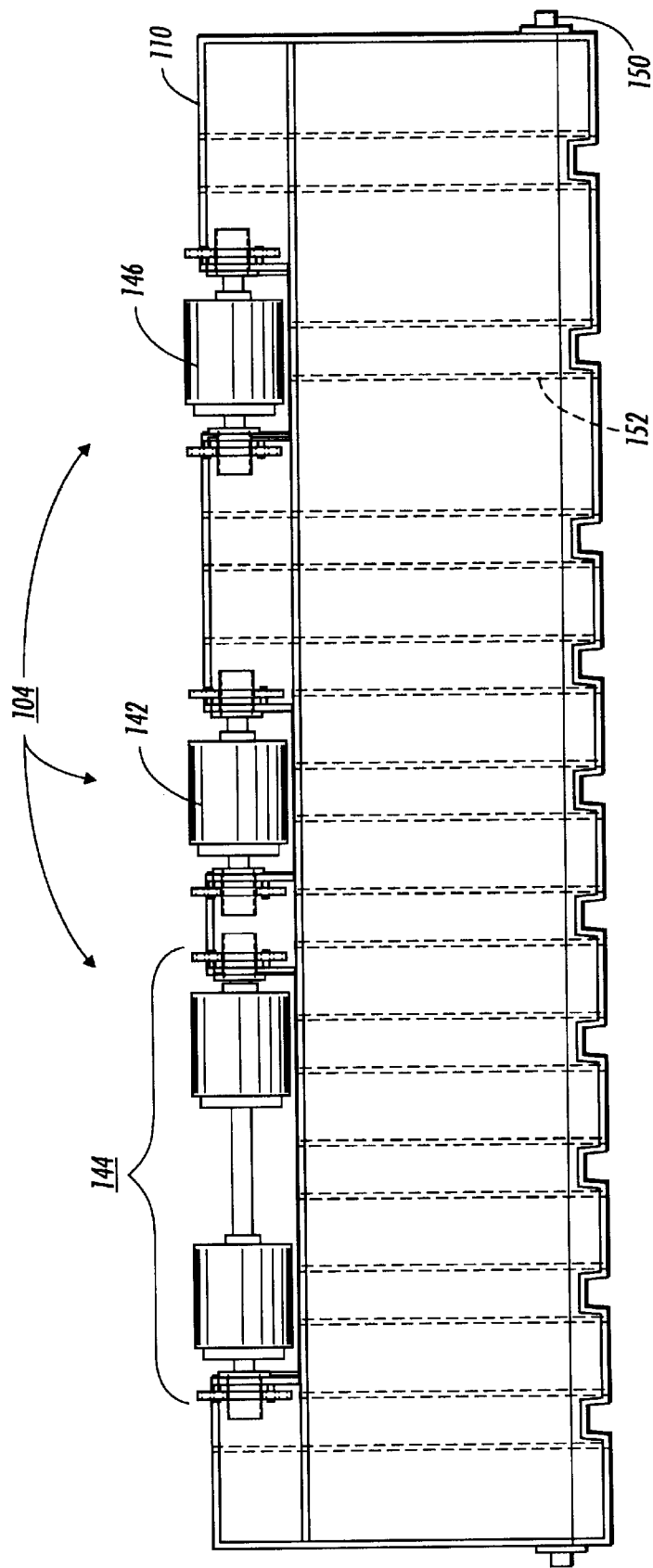
FIG. 7 is a plan view of a horizontally pivoting door chute utilizing the FIG. 1 bushing for use in the FIG. 3 printing machine

Referring now to FIG. 7, the horizontally pivoting door chute 110 is shown in greater detail. The backup roll 104 is in the form of a series of 4 smaller rolls including a commonly mounted roll assembly 142 as well as first and second single roll assemblies 144 and 146, respectively. The door chute 110 is pivotable about pins 150.

The door chute 110 may be made of any suitable durable material, for example a plastic or a metal and may include ribs 152 positioned vertically thereon.

Figure 2:
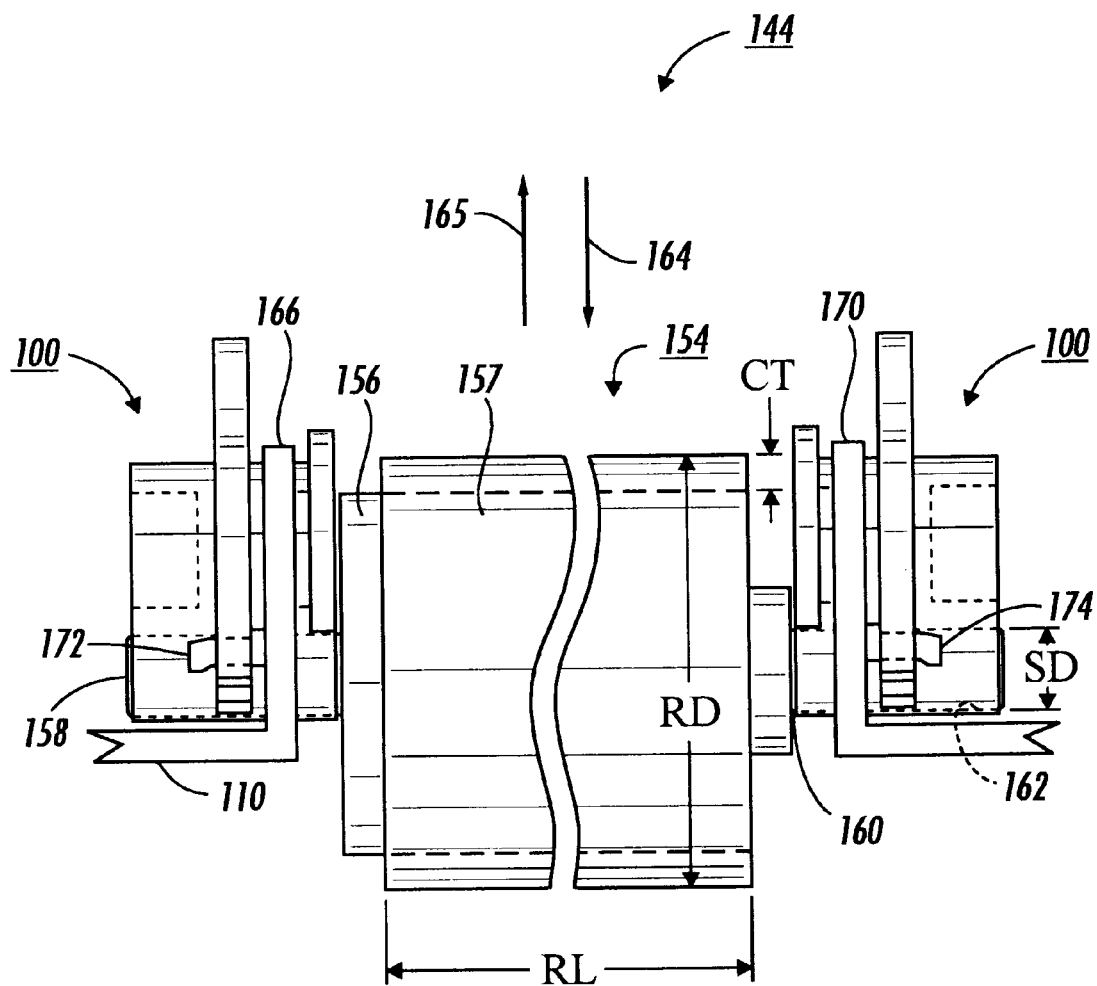
FIG. 2 is a plan view of a floating roller utilizing the bushing of FIG. 1.

Referring now to FIG. 2, first single roll assembly 144 is shown in greater detail. The roll assembly 144 includes a rotating member or roll 154. The roll 154 may be made of any suitable durable material and have any appropriate size capable of providing a backup function to the drive rolls. For example, the roll 154 may include a rigid core 156, including a left shaft 158 and a right shaft 160 extending outwardly therefrom. A foam sleeve 157 with a thickness CT of, for example, 0.06 inches may be assembled over the plastic core 156 and serves to assist in providing bias for the drive roll.

The core 156 may be made of any durable suitable material, for example a plastic. The sleeve may be made of any suitable material, for example a plastic foam. The roll 154 may have any suitable size and may, for example, have a diameter RD of say, approximately 0.75 inches and an overall length RL of approximately 1.00 inches. The left shaft 158 and the right shaft 160 may, for example, have a shaft diameter SD of approximately 0.15 inches.

The left shaft 158 and right shaft 160 of the roll 154 are rotatably supported by a pair of biasing members 100. One of each of the biasing members 100 is associated with each of the left shaft 158 and the right shaft 160. The biasing members 100 include a bushing bore 162 which is matingly fitted to the shafts 158 and 160. The biasing members 100 are slidably mounted in the direction of arrows 164 and 165 to the door chute 110. The door chute 110 preferably includes a left vertical guide 166 and a right vertical guide 170 which limit the motion of the roll 154 to the direction of arrows 164 and 165. The door chute 110 further preferably includes a left hook 172 and a right hook 174 which are utilized to bias the biasing members 100 in the direction of arrow 164.

Figure 1:
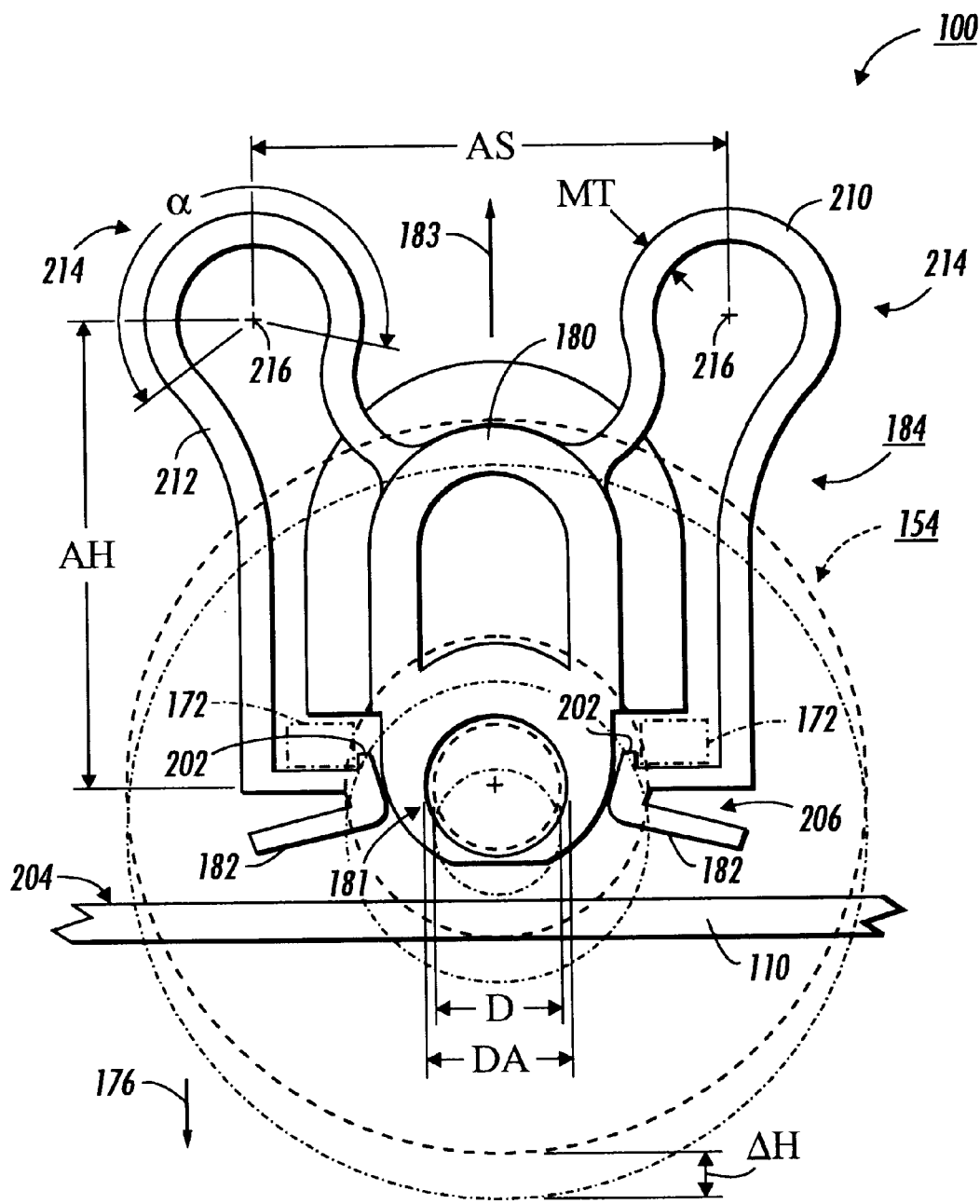
FIG. 1 is a plan view of a bushing with an integral biasing feature according to the present invention.

Referring now to FIG. 1, the biasing member 100 according to the present invention, is shown in greater detail. The bushing 100 is mountable in a housing such as door chute 110 and is utilized for supporting roll 154 and for providing a bias force for the roll 154 in the direction of arrow 176. The bushing includes a body 180 which defines an aperture or opening 181 therein. The bushing 100 further includes a mounting member 182 for mounting the bushing 100 to the door chute 110. The bushing 100 also includes a biasing member 184. The biasing member 184 is positioned between the mounting member 182 and the body 180 to provide relative motion of the body 180 in the direction of arrow 183 with respect to the mounting member.

Preferably, and as shown in FIG. 1, the bushing 100 is made of an integral construction with the mounting member 182, the body 180, and the biasing member 184 being made of a one-piece construction. Such a one-piece construction may be provided by molding the bushing 100 in a plastic molding machine from a plastic material. The bushing 100 may be made of any suitable durable material and at least the biasing member 184 is preferably made from a resilient material. For example, the bushing 100 may be made from a plastic, for example, acetal or Delrin®, a product of duPont (U.K). Ltd. has been found to be suitable for this application.

The body 100 may have any suitable shape and preferably includes the aperture 181. The aperture 181 preferably has a cylindrical shape and if cylindrical has a diameter DA which is matingly fitted to the shafts 158 and 160 (see FIG. 2).

Referring now to FIGS. 4 and 5, the body 180 preferably includes a body shoulder 186 which may have a width ST of, for example, 0.05 inches. The body shoulder 186 and the biasing member 184 provide a channel 190 there between.

The channel 190 has a channel width GW which is similar to, and provides for, slidable fit with the width GT of the right and left vertical guides 166 and 170. The channel 190 serves therefore to limit motion in the direction of arrows 192 and 194. The body 180 further includes a body width BD which matingly fits with opening 196 in the left guide 166. The dimension BD may be, for example, 0.27 inches. The diameter BD serves to limit motion of the bushing 100 in the direction of arrows 198 and 200.

Referring again to FIG. 1, the mounting member 182 may have any suitable shape capable of securing the bushing 100 to the housing 110. For example, the mounting member 182 may be in the form of a pair of symmetrically opposed pliable clips 182. The pliable clip 182 includes a lip 202 which is used to secure the clip 182 to the hooks 172. The pliable clip 182 may be secured between the extruded hooks 172 and surface 204 of the housing 110. It should be appreciated that, alternatively, the pliable clip 182 may be secured by positioning the hooks 172 in opening 206 of the clip 182.

The biasing member 184 may be any suitable shape capable of providing biasing in the direction of arrow 176 for the bushing 100. Preferably, the biasing member 184 provides for a motion ΔH of the aperture 181 of say, for example, 0.05 to 0.25 inches. It should be appreciated that the required motion of ΔH is dependent on component and assembly dimensional tolerances and most importantly, upon the variety of paper substrates to be utilized in the printing machine.

Preferably, and as shown in FIG. 1, biasing member 184 includes first and second arcuate members or legs 210 and 212, respectively. The first arcuate member 210 is preferably spaced from the second arcuate member 212. Preferably, the first arcuate member 210 and the second arcuate member 212 are symmetrically positioned about the body 180. Arcuate members provide for the pliability necessary for the motion of the aperture 181 in the direction of arrow 183.

The second arcuate member 212 extends from the body 180 to one of the mounting members 182 while the first arcuate member 210 extends from the body 180 to the other mounting member 182. The first and second arcuate members 210 and 212 preferably include an arcuate portion 214 which is defined by an included angle α of approximately 160 to 240 degrees with 210 degrees being preferred. When utilizing a material such as Delrin®, the arcuate portions 214 may be defined by a thickness MT of approximately 0.035 inches and have a length ML (see FIGS. 4 and 5) of approximately 0.07 inches. The first and second arcuate members 210 and 212 may be spaced apart a distance AS between arcuate portion center lines 216 of the arcuate portion 214 of approximately 0.53 inches. The arcuate center lines 216 may be, for example, a distance AH from the aperture 181 of approximately 0.53 inches.

By providing a bushing with an integral molded spring, a backup roll assembly may be provided with fewer parts, be easy to assemble, and be inexpensive.

By providing a backup roll with a bushing with an integral molded spring and integral mounting member, a simple, inexpensive, and easy to assemble spring bias roll may be provided.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the invention.

What is claimed is:

1. A bushing mountable in a housing for supporting a rotating member and for providing a bias force to the rotating member in a first direction, the bushing comprising:

a body defining an aperture therein;

a mounting member for mounting the bushing to the housing;

a biasing member operably associated with said body and said mounting member, at least two of said biasing member, said mounting member and said body being integral with each other wherein said biasing member extends outwardly from said body; and wherein said mounting member extends from said biasing member.

2. A bushing according to claim 1, wherein at least two of said biasing member, said mounting member and said body have a one-piece construction.

3. A bushing according to claim 2:

wherein said biasing member, said mounting member and said body comprises a plastic; and wherein said biasing member, said mounting member and said body have a one-piece construction.

4. A bushing according to claim 1, wherein said biasing member comprises an acetal.

5. A bushing according to claim 1, wherein said biasing member comprises a resilient arcuate member.

6. A bushing according to claim 1, wherein said mounting member includes a pliable clip for removably mounting said bushing to said housing.

7. A bushing according to claim 1:

wherein the mounting member includes a mounting face for mounting the bushing to the housing; and wherein the first direction is perpendicular to the mounting face.

8. An electrophotographic printing machine having a bushing mountable in a housing for supporting a rotating member and for providing a bias force to the rotating member in a first direction, the bushing comprising:

a body defining an aperture therein:

a mounting member for mounting the bushing to the housing;

a biasing member operably associated with said body and said mounting member, at least two of said biasing member, said mounting member and said body being integral with each other wherein said biasing member extends outwardly from said body; and wherein said mounting member extends from said biasing member.

9. A printing machine according to claim 8, wherein at least two of said biasing member, said mounting member and said body have a one-piece construction.

10. A printing machine according to claim 9:

wherein said biasing member, said mounting member and said body comprises a plastic; and wherein said biasing member, said mounting member and said body have a one-piece construction.

11. A printing machine according to claim 8, wherein said biasing member comprises an acetal.

12. A printing machine according to claim 8, wherein said biasing member comprises a resilient arcuate member.

13. A printing machine according to claim 8:

wherein the mounting member includes a mounting face for mounting the bushing to the housing; and wherein the first direction is perpendicular to the mounting face.

14. A bushing mountable in a housing for supporting a rotating member and for providing a bias force to the rotating member in a first direction, the bushing comprising:

a body defining an aperture therein;

a mounting member for mounting the bushing to the housing; and a biasing member operably associated with said body and said mounting member, said biasing member including a first arcuate member extending from said body and a second arcuate member extending from said body and spaced from the first arcuate member, said biasing member extending outwardly from said body, said biasing member, said mounting member and said body having a one-piece construction.

15. A bushing mountable in a housing for supporting a rotating member and for providing a bias force to the rotating member in a first direction, the bushing comprising:

a body defining an aperture therein;

a mounting member of mounting the bushing to the housing;

a biasing member operably associated with said body and said mounting member, at least two of said biasing member, said mounting member and said body being integral with each other;

wherein said biasing member comprises a first arcuate member extending from said body; and wherein said biasing member comprises a second arcuate member extending from said body and spaced from the first arcuate member.

16. A bushing according to claim 15, wherein said bushing has a uniform cross section.

17. An electrophotographic printing machine having a bushing mountable in a housing for supporting a rotating member and for providing a bias force to the rotating member in a first direction, the bushing comprising:

a body defining an aperture therein;

a mounting member of mounting the bushing to the housing;

a biasing member operably associated with said body and said mounting member, at least two of said biasing member, said mounting member and said body being integral with each other;

wherein said biasing member comprises a first arcuate member extending from said body; and wherein said biasing member comprises a second arcuate member extending from said body and spaced from the fist arcuate member.

18. A printing machine according to claim 17, wherein said bushing has a uniform cross section.

* * * * *